(12) United States Patent
Vengerov et al.

(10) Patent No.: US 9,465,715 B2
(45) Date of Patent: Oct. 11, 2016

(54) OPTIMIZING THE NUMBER OF SHARED PROCESSES EXECUTING IN A COMPUTER SYSTEM

(71) Applicant: Oracle International Corporation, Redwood Shores, CA (US)

(72) Inventors: David Vengerov, San Jose, CA (US); Douglas Neale, Petrie (AU)

(*) Notice: Subject to any disclaimer, the term of this patent is extended or adjusted under 35 U.S.C. 154(b) by 173 days.

(21) Appl. No.: 14/302,675

(22) Filed: Jun. 12, 2014

(65) Prior Publication Data
US 2015/0363291 A1 Dec. 17, 2015

(51) Int. Cl.
G06F 11/34 (2006.01)
G06F 17/30 (2006.01)

(52) U.S. Cl.
CPC ....... *G06F 11/3433* (2013.01); *G06F 11/3452* (2013.01); *G06F 17/30* (2013.01); *G06F 2201/875* (2013.01)

(58) Field of Classification Search
CPC .................................................. G06F 11/3433
See application file for complete search history.

(56) References Cited

U.S. PATENT DOCUMENTS

| 2007/0083793 A1* | 4/2007 | Roth .................... G06F 11/3414 714/25 |
| 2011/0041132 A1* | 2/2011 | Andrade ............... G06F 9/5083 718/102 |
| 2012/0304175 A1* | 11/2012 | Damola ............... G06F 11/3419 718/1 |
| 2014/0082249 A1* | 3/2014 | Pan ........................ G06F 13/16 710/308 |
| 2014/0136682 A1* | 5/2014 | Lukas ............... G06F 17/30306 709/224 |
| 2015/0020076 A1* | 1/2015 | Lei .......................... G06F 9/50 718/104 |

OTHER PUBLICATIONS

Prof. Jonathan Shewchuk, Array, UC Berkely class material, Jan. 2014, https://www.cs.berkeley.edu/~jrs/61b/lec/05.pdf.*

* cited by examiner

*Primary Examiner* — Emerson Puente
*Assistant Examiner* — Charlie Sun
(74) *Attorney, Agent, or Firm* — Miles & Stockbridge PC (57) ABSTRACT

A system optimizes a number of shared server processes executing on a processor. The system creates, in a memory, a data array for storing a plurality of performance metric values, each associated with a number of shared server processes. The system selects a value for an optimized number of shared server processes according to a first procedure based on the performance metric, observes a performance metric associated with the selected optimized number, and stores, in the data array, the observed performance metric. The system repeats the selecting, observing and storing until at least a predetermined number of contiguous data values are stored in the data array. The system selects the value for the optimized number according to a second procedure based on a slope of the performance metric. The system observes the performance metric associated with the selected optimized number, and stores, in the data array, the observed performance metric.

20 Claims, 3 Drawing Sheets

| t | n | Requests Completed | Performance Metric | u[n] | slope | New n |
|---|---|---|---|---|---|---|
| 100 | 10 | 126 | 1587.6 | 1587.6 | - | 11 |
| 200 | 11 | 139 | 1756.4 | 1756.4 | - | 12 |
| 300 | 12 | 152 | 1925.3 | 1925.3 | - | 13 |
| 400 | 13 | 153 | 1800.7 | 1800.7 | - | 12 |
| 500 | 12 | 147 | 1800.7 | 1894.2 | - | 11 |
| 600 | 11 | 138 | 1731.3 | 1750.2 | - | 12 |
| 700 | 12 | 151 | 1900.1 | 1895.7 | - | 13 |
| 800 | 13 | 161 | 1993.9 | 1849.0 | - | 12 |
| 900 | 12 | 140 | 1633.3 | 1830.1 | - | 13 |
| 1000 | 13 | 148 | 1684.9 | 1808.0 | - | 12 |
| 1100 | 12 | 159 | 2106.7 | 1899.2 | - | 11 |
| 1200 | 11 | 140 | 1781.8 | 1758.1 | - | 12 |
| 1300 | 12 | 146 | 1776.3 | 1868.5 | - | 13 |
| 1400 | 13 | 164 | 2068.9 | 1873.2 | - | 14 |
| 1500 | 14 | 164 | 1921.1 | 1921.1 | 78.2 | 17 |
| 1600 | 17 | 194 | 2213.9 | 2213.9 | 71.7 | 20 |
| 1700 | 20 | 235 | 2761.2 | 2761.2 | 140.0 | 23 |
| 1800 | 23 | 258 | 2894.1 | 2894.1 | 113.4 | 26 |
| 1900 | 26 | 264 | 2680.6 | 2680.6 | -13.4 | 25 |
| 2000 | 25 | 265 | 2809.0 | 2766.1 | 27.6 | 26 |
| 2100 | 26 | 288 | 3190.1 | 2808.0 | 20.5 | 27 |
| 2200 | 27 | 307 | 3490.7 | 3490.7 | 65.8 | 28 |

FIG. 3

OPTIMIZING THE NUMBER OF SHARED PROCESSES EXECUTING IN A COMPUTER SYSTEM

TECHNICAL FIELD

One embodiment is directed generally to a computer system, and, in particular, to a computer system that optimizes the number of shared processes executing thereon.

BACKGROUND

A computer system typically executes many different processes at the same time, including operating system (OS) processes, utility processes, resource processes, communications processes, application processes, etc. The computer system may include multiple processors, and a multitasking OS allows multiple processes to share processors and other system resources. Each process may include multiple threads of execution, which may concurrently execute on one or more processors. Generally, it may be desired to manage the number of processes executing on the computer system in order to optimize system performance.

Certain server-based applications service data requests that are received over a network from one or more client computers. In a database application, these requests may be serviced using a dedicated server connection model or a shared server connection model. In the dedicated model, a dedicated server process is created for each client connection, and services the requests that are received from that client until the connection is terminated. The dedicated model increases the use of computer system resources, such as memory, processor time, etc., and may not be optimal for database applications that have high connection rates. In the shared model, a pool of shared server processes is managed by a supervisory process, such as a dispatcher, which assigns shared processes to service client connection requests that are received and stored in a request queue. The shared model reduces the number of concurrently executing server processes, as well as the amount of memory consumed, as compared to the dedicated model.

SUMMARY

One embodiment is a system that optimizes a number of shared server processes executing on a processor. The system creates, in a memory, a data array for storing a plurality of performance metric values, each performance metric value being associated with a number of shared server processes. The system selects a value for an optimized number of shared server processes according to a first procedure based on the performance metric. The system observes a performance metric associated with the optimized number of shared server processes selected according to the first procedure. The system stores, in the data array, the performance metric associated with the optimized number of shared server processes selected according to the first procedure. The system repeats the selecting, observing and storing until at least a predetermined number of contiguous data values are stored in the data array. The system selects the value for the optimized number of shared server processes according to a second procedure based on a slope of the performance metric. The system observes the performance metric associated with the optimized number of shared server processes selected according to the second procedure. The system stores, in the data array, the performance metric associated with the optimized number of shared server processes selected according to the second procedure.

DETAILED DESCRIPTION

Embodiments of the present invention will now be described with reference to the drawing figures, in which like reference numerals refer to like parts throughout.

Embodiments of the present invention advantageously increase the throughput of a computer system by optimizing the number of shared processes in a pool, such as, for example, a shared server process pool for a database application. Other embodiments of the present invention may advantageously increase the throughput of a computer system by optimizing the number of servers allocated from a shared server pool, such as, for example, an authentication server pool, a slave server pool, etc., by optimizing the number of worker/thread pools in web-based applications, etc.

One known way to optimize the number of shared processes executing in a computer system is to determine an integer value n, which represents the number of shared processes, that effectively maximizes an unknown noisy function f(n) defined on the integer domain, which represents the computer system behavior to be optimized. For a database system using a shared server connection model, n is the number of shared server processes and f(n) may be related to database throughput, such as, for example, the number of database requests served. One known method attempts to optimize the number of shared server processes as follows:

```
new_shared_server_processes
    = old_shared_server_processes
    * existing_server_utilization
    * ( current_requests_served + queued_requests ) /
      current_requests_served
```

While this method is not likely to waste resources because the number of shared server processes is reduced when existing server utilization drops below 100%, the resulting database throughput can be very poor in certain circumstances.

For example, in one test, 20,000 requests from 200 constantly-active connections were processed using 20 shared server processes, and it was determined that 180 requests always remained in the queue. The number of shared server processes was initialized to 20, which remained essentially constant during the processing of the requests. This method did not increase the number of shared server processes to improve processing throughput and to reduce or eliminate the constantly-queued requests. In other words, an incoming request had to wait until the 180 queued requests were completed by the 20 shared server processes, which produced a 9× increase of the average request processing time.

In order to improve the average request processing time and overall throughput, the number of shared server processes could be increased to 200, so that each of the 200 constantly-active connections is served by a dedicated server process. The dedicated server connection model eliminates queuing time, but may be inefficient and result in overloading, contention, etc., as noted above. Accordingly, an improved method for optimizing the number of shared server processes in a computer system has been developed.

Figure 1:
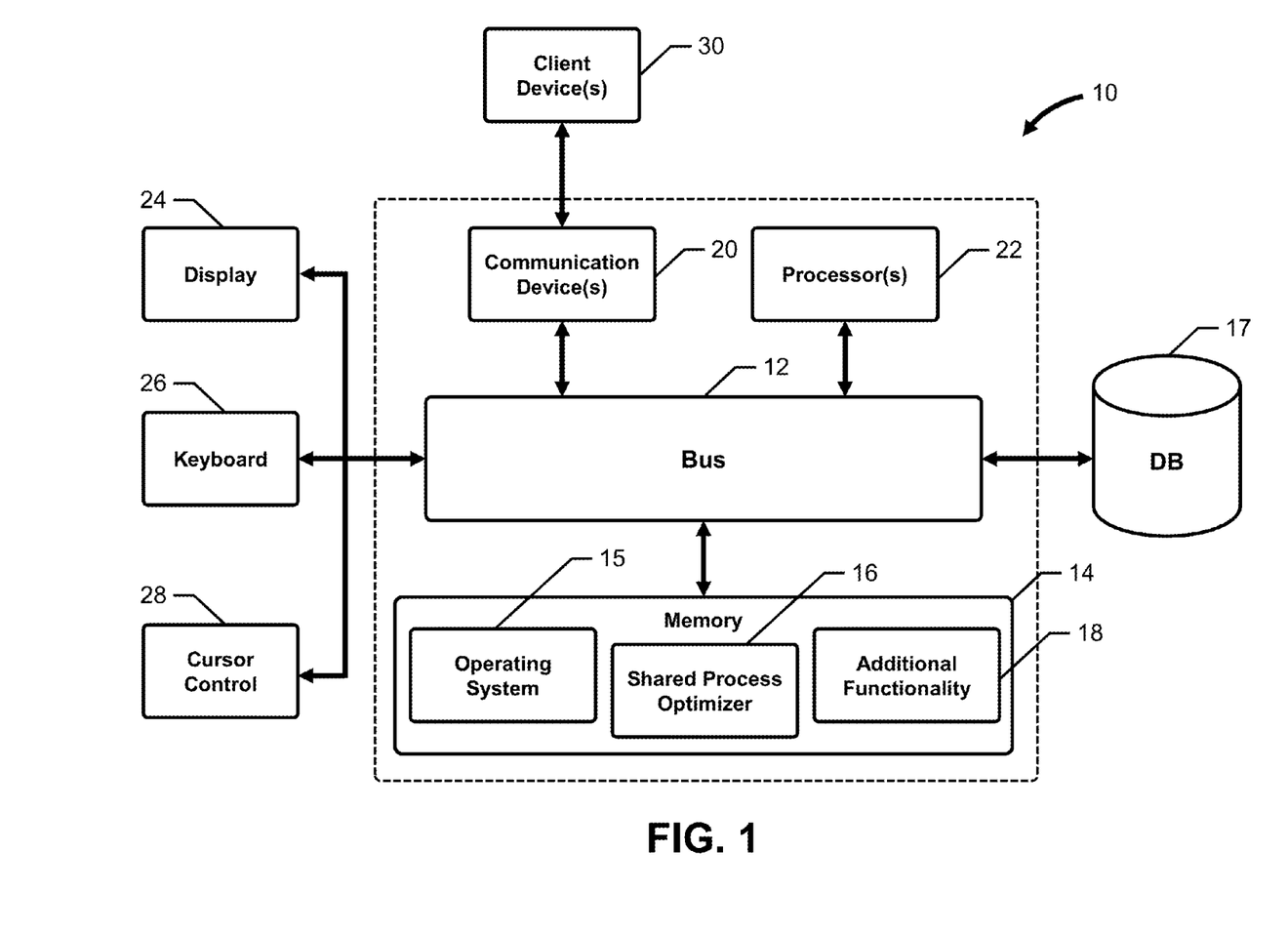
FIG. 1 is a block diagram of a computer server/system, in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a user client, system 10 may be a smartphone that includes a processor, memory and a display, but may not include one or more of the other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of storage devices, such as, for example, random access memory ("RAM"), read only memory ("ROM"), static storage devices such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a shared process optimizer module 16 for optimizing shared processes, and all other functionality disclosed herein. System 10 can include one or more additional functional modules 18, such as, for example, Oracle Database 12c Enterprise Edition or other type of database management system. Alternatively, shared process optimizer module 16 may be included within functional module 18. A database 17 is coupled to bus 12 to provide, inter alia, centralized storage for shared process optimizer module 16 and functional modules 18. System 10 can be part of a larger system, and one or more clients 30 may connect to the communication device 20 through one or more intervening networks (not shown), such as, for example, a Local Area Network (LAN), a Wide Area Network (WAN), a wireless network (WiFi), the Internet, etc.

For a database application using a shared server connection model, shared process optimizer module 16 sets the number of shared server processes n to an initial value, and then increases or decreases the number of shared server processes n until a performance metric related to database throughput is maximized. In one embodiment, the performance metric is database throughput, such as, for example, the number of completed client requests processed by the shared server processes. Computer system resource contention may be quite high when the number of shared server processes is optimized using this performance metric. In another embodiment, the performance metric is database throughput squared per process, such as, for example, the square of the number of completed client requests divided by the number of shared server processes n. This performance metric tends to peak before database throughput is maximized, which keeps the level of computer system resource contention lower. Other performance metrics are also contemplated by embodiments of the present invention, including, for example, any performance metric that may be represented by a hump-shaped function with at least one local maximum.

Figure 2:
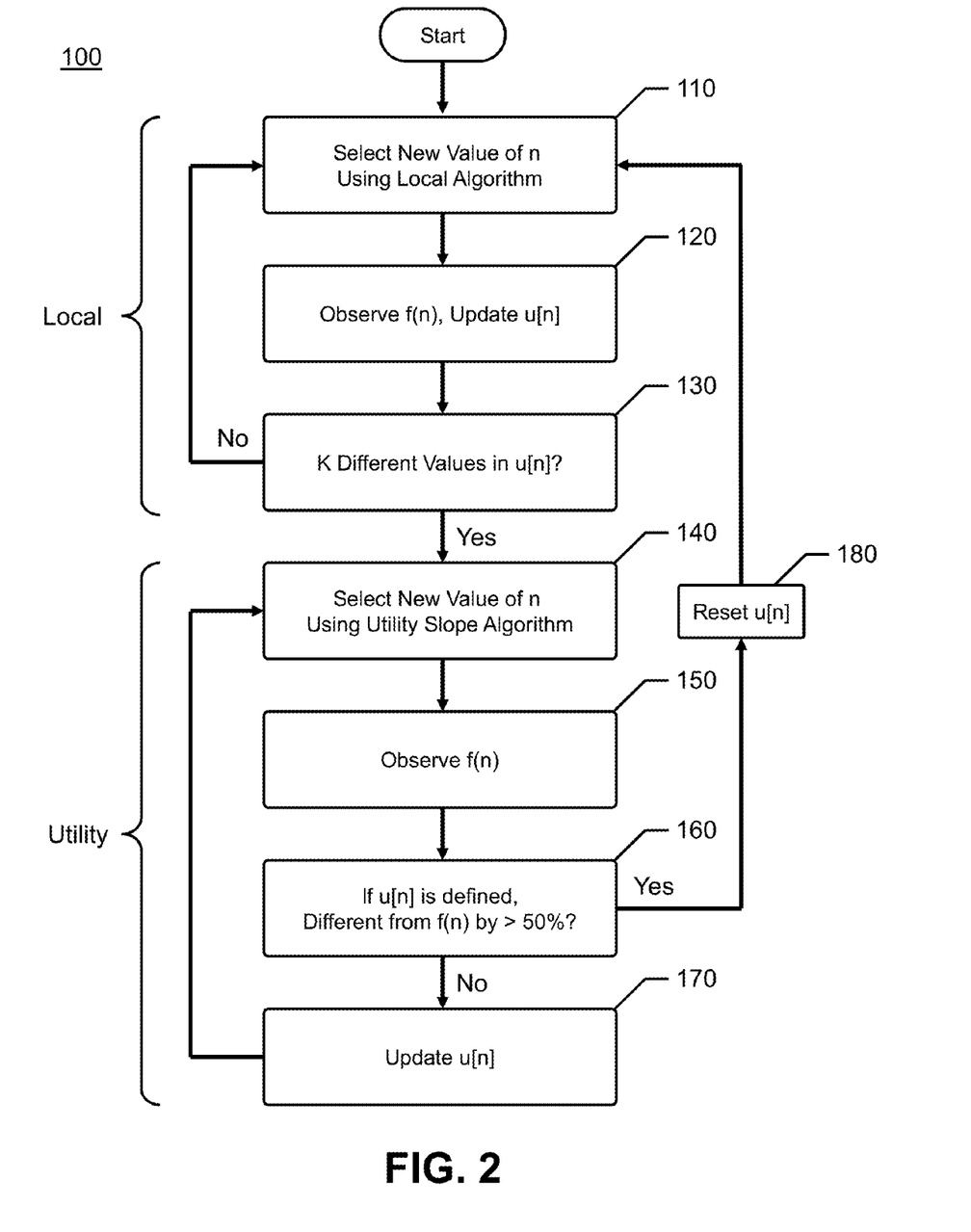
FIG. 2 is a flow diagram of the functionality of a shared process optimizer module of FIG. 1, in accordance with an embodiment of the present invention.

FIG. 2 is a flow diagram 100 of the functionality of shared process optimizer module 16 of FIG. 1, in accordance with an embodiment of the present invention. In some embodiments, the functionality of the flow diagram 100 may be implemented by software stored in memory or other computer readable, tangible non-transitory medium, and executed by one or more processors. In other embodiments, the functionality may be performed by hardware, such as, for example, an application specific integrated circuit (ASIC), a programmable gate array (PGA), a field programmable gate array (FPGA), etc., or through any combination of hardware and software.

Generally, flow diagram 100 may be divided into two algorithm sections or procedures, a local algorithm section (procedure) and a utility algorithm section (procedure). After initialization and at regular time intervals thereafter, the local algorithm is used to determine whether the current value for n, the number of shared server processes, should be changed based on the observation of f(n), the performance metric, which is then stored in a data array u[n] of the values of f(n). Data array u[n] may be created in memory 14, for example, and initialized to zero prior to observing f(n). Once there are a sufficient number of contiguous entries in u[n] and at regular time intervals thereafter, the utility algorithm is used to determine whether the current value for n should be changed based on the slope of f(n), which is calculated using the values stored in the utility array u[n]. The observation of f(n) is stored in u[n], and, if the current observation of f(n) differs from the previous value stored in u[n] by a certain percentage, which suggests that the load may have changed, then u[n] is reset and the local algorithm is used again to determine n, as before. This functionality is described in more detail below.

At 110, a new value of n, the number of shared server processes, is selected. For the initial pass through the local algorithm section, n may be initialized to any number between a minimum number of shared server processes (e.g., 1) and a maximum number of shared server processes (e.g., 100), such as, for example, 10, 50, etc. For example, at t=0, the initial value for n is 10, and the number of shared server processes executing on processor 22 is set to n.

Figure 3:
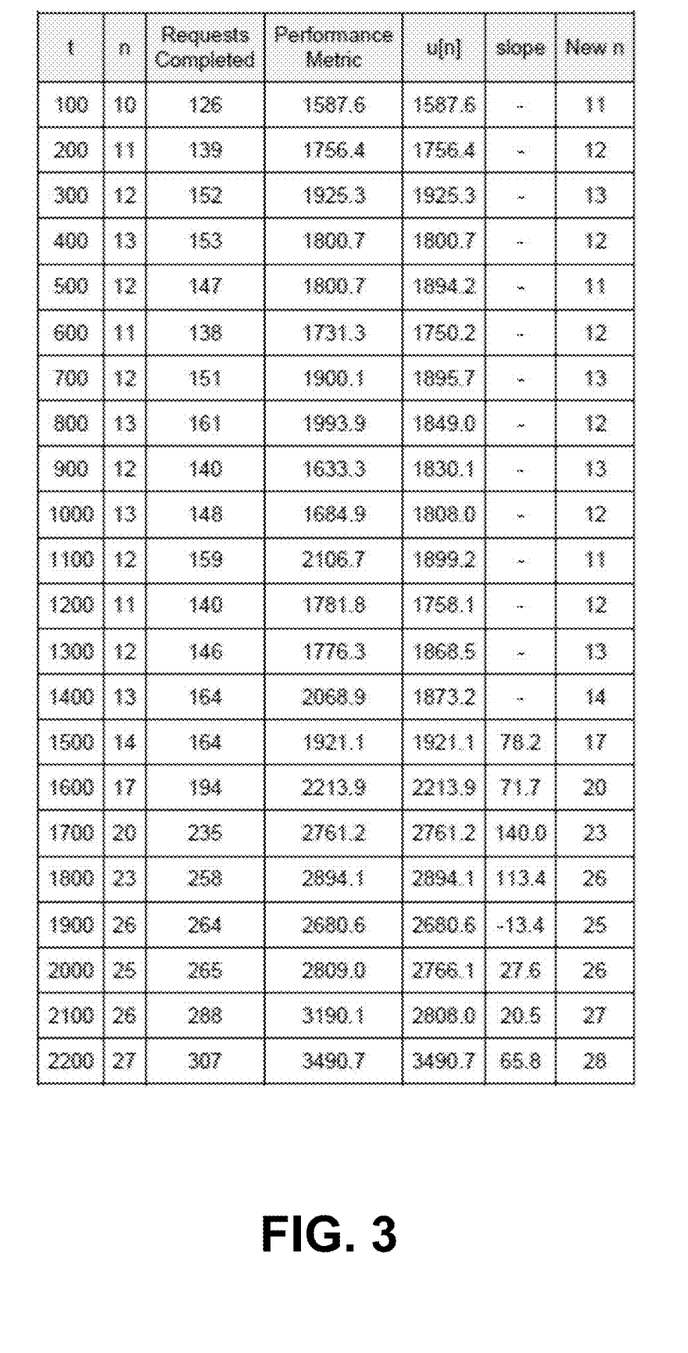
FIG. 3 is a table of values depicting the optimization of the number of shared server processes for a database application, in accordance with an embodiment of the present invention.

FIG. 3 presents a summary of example data discussed with respect to the details of the flow diagram 100 in accordance with one embodiment.

After a period of time, during which the n shared server processes are executing on processor 22, f(n) is observed and array u[n] is updated at 120. For example, at t=100, the number of completed client requests may be 126, and the performance metric is calculated to be 1587.6 (i.e., $126^2/10$). Using n=10 as the array index, u[10] is then set to 1587.6. In one embodiment, an exponential moving average may be stored in u[n], such as, for example, u[n]=0.75*u[n]+0.25*f(n). For t=100, u[10] may be set to 1587.6, since no other value has yet been stored in u[10].

At 130, the array u[n] is inspected to determine whether there are a sufficient number of contiguous values N in the array u[n]. In one embodiment, the minimum number of contiguous values K=5, so there must be a total of four other points to the left and/or right of u[10] to satisfy the condition. For example, values for f(n) may be stored in u[6], u[7], u[8], u[9] and u[10] in order to satisfy the condition, or, values for f(n) may be stored in u[10], u[11], u[12], u[13] and u[14] in order to satisfy the condition, or, values for f(n) may be stored in u[8], u[9], u[10], u[11] and u[12] in order to satisfy the condition, etc. At t=100, only one value is stored in u[n], i.e., u[10]=1587.6, and the local algorithm section loops back to 110.

At 110, a new value of n, the number of shared server processes, is selected. At t=100, only one pass has been made through the local algorithm section, so n is simply incremented by the value of the minimum step size, e.g., $n_{new}$=n+1 or 11.

After a period of time, during which the n shared server processes are executing on processor 22, f(n) is observed and array u[n] is updated at 120. For example, at t=200, the number of completed client requests may be 139, and the performance metric is calculated to be 1756.4 (i.e., $139^2/11$). Using n=11 as the array index, u[11] is then set to 1756.4. In one embodiment, an exponential moving average may be stored in u[n]. For t=200, u[11] may be set to 1756.4, since no other value has yet been stored in u[11].

At 130, the array u[n] is inspected to determine whether there are a sufficient number of contiguous values N in the array u[n]. At t=100, only two values are stored in u[n], i.e., u[10] and u[11], so the local algorithm section loops back to 110.

At 110, a new value of n, the number of shared server processes, is selected. At t=200, only two passes have been made through the local algorithm section, so the values for u[10] and u[11] are compared and n is changed accordingly. For example, if u[11]>u[10] then n=n+1, or if u[11]<u[10] then n=n−1, or if u[11]=u[10] then n=n. In this case, u[11]>u[10], so $n_{new}$=n+1 or 12.

After a period of time, during which the n shared server processes are executing on processor 22, f(n) is observed and array u[n] is updated at 120. For example, at t=300, the number of completed client requests may be 152, and the performance metric is calculated to be 1925.3 (i.e., $152^2/12$). Using n=12 as the array index, u[12] is then set to 1925.3. In one embodiment, an exponential moving average may be stored in u[n]. For t=300, u[12] may be set to 1925.3, since no other value has yet been stored in u[12].

At 130, the array u[n] is inspected to determine whether there are a sufficient number of contiguous values N in the array u[n]. At t=100, only three values are stored in u[n], i.e., u[10], u[11] and u[12], so the local algorithm section loops back to 110.

At 110, a new value of n, the number of shared server processes, is selected. After three passes through the local algorithm section, n may be determined using at least two different methods. In a two point embodiment, $n_{new}$ may be determined based on the current and previous values of n and u[n], i.e., n and n1, u[n] and u[n1]. In a three point embodiment, $n_{new}$ may be determined based on the current and previous two values of n and u[n], i.e., n, n1 and n2, u[n], u[n1] and u[n2]. Other methods are also contemplated by embodiments of the present invention.

In the two-point embodiment, the values of n and n1 are compared to determine whether the number of shared processes is increasing, decreasing or staying the same, u[n] and u[n1] are compared to determine whether the value of the performance metric is increasing or decreasing, and n is selected accordingly. If n is increasing (i.e., n>n1) and the performance metric is increasing (i.e., u[n]>u[n1]), then n is incremented by 1. To the contrary, if n is increasing (i.e., n>n1) and the performance metric is decreasing (i.e., u[n]<u[n1]), then n is decremented by 1. Similarly, if n is decreasing (i.e., n<n1) and the performance metric is increasing (i.e., u[n]>u[n1]), then n is decremented by 1. And, if n is decreasing (i.e., n<n1) and the performance metric is decreasing (i.e., u[n]<u[n1]), then n is incremented by 1. If n=n1, then a random change in either direction may be taken.

For the two point embodiment, at t=300, n>n1 and u[n]>u[n1], so $n_{new}$=n+1 or 13.

In the three point embodiment, similar comparisons between n, n1 and n2 and u[n], u[n1] and u[n2] are made in order to select the new value for n. For example, there may be nine test conditions for n, n1 and n2, with several expressions for selecting the new value for n for each test condition:

TABLE 1

Three Point Algorithm Test Conditions and Expressions

| Case | Test Condition | Expression for n |
|---|---|---|
| 1 | n2 < n1 < n<br>or<br>n2 > n1 > n | if u[n] < u[n1] then $n_{new}$ = n1<br>otherwise<br>if n > n1 then $n_{new}$ = n + 1<br>otherwise<br>$n_{new}$ = n − 1 |
| 2 | n2 > n1 = n | if u[n] = u[n1] = u[n2] then $n_{new}$ = n<br>otherwise<br>if (u[n] + u[n1])/2 > u[n2] then $n_{new}$ = n − 1<br>otherwise<br>$n_{new}$ = n2 + 1 |
| 3 | n2 < n1 = n | if u[n] = u[n1] = u[n2] then $n_{new}$ = n<br>otherwise<br>if (u[n] + u[n1])/2 > u[n2] then $n_{new}$ = n + 1<br>otherwise<br>$n_{new}$ = n2 − 1 |
| 4 | n2 = n1 < n | if u[n] = u[n1] = u[n2] then $n_{new}$ = n ± 1<br>otherwise<br>if (u[n2] + u[n1])/2 > u[n] then $n_{new}$ = n2 − 1<br>otherwise<br>$n_{new}$ = n + 1 |
| 5 | n2 = n1 > n | if u[n] = u[n1] = u[n2] then $n_{new}$ = n ± 1<br>otherwise<br>if (u[n2] + u[n1])/2 > u[n] then $n_{new}$ = n2 + 1<br>otherwise<br>$n_{new}$ = n − 1 |
| 6 | n2 ≤ n < n1 and<br>n2 ≤ n1<br>or<br>n2 ≥ n > n1 and<br>n2 ≥ n1 | if u[n] < u[n1] && n != 2<br>or<br>if (u[n] + u[n2])/2 < u[n1 && n = n2<br>then<br>$n_{new}$ = n1<br>otherwise<br>if u[n] = u[n1] then $n_{new}$ = n |

TABLE 1-continued

Three Point Algorithm Test Conditions and Expressions

| Case | Test Condition | Expression for n |
|---|---|---|
| | | otherwise<br>if n > n1 then $n_{new}$ = n + 1<br>otherwise<br>if n < n1 then $n_{new}$ = n − 1 |
| 7 | n < n2 < n1 | if u[n] > u[n1] then $n_{new}$ = n2 − 1<br>otherwise<br>$n_{new}$ = n1 |
| 8 | n > n2 > n1 | if u[n] > u[n1] then $n_{new}$ = n2 + 1<br>otherwise<br>$n_{new}$ = n1 |
| 9 | n2 = n1 = n | if u[n] = u[n1] = u[n2] then $n_{new}$ = n ± 1<br>otherwise<br>$n_{new}$ = n ± 1 |

At t=300, n>n1>n2, u[n]>u[n1] and n>n1, so $n_{new}$=n+1 or 13 (Case 1).

The local algorithm section of flow diagram 100 is executed until the array u[n] has sufficient number of contiguous values N. At t=1500, five values are stored in u[n], i.e., u[10], u[11], u[12], u[13] and u[14], so N=K and the utility algorithm section is then entered from 130.

At 140, a new value of n, the number of shared server processes, is selected. In one embodiment, the slope of the performance metric is calculated based on the N contiguous values stored in u[n], and then n is determined based on the slope. For example, the slope may be calculated by fitting a linear function to the N contiguous values stored in u[n] as follows:

Determine the average number of shared server processes, $n_{avg}$

Determine the average performance metric, $u_{avg}$

Determine the sum of the squares of the normalized number of shared processors, $n_{norm}^2$ Determine the products of the normalized number of shared processes and the normalized performance metric, $n_{norm}*u_{norm}$ Calculate the slope as $n_{norm}*u_{norm}/n_{norm}^2$ At t=1500, the slope is calculated to be 78.2.

In one embodiment, the new value for n is determined by comparing the calculated slope to the value stored in u[n]. For example, if the slope is greater than 3% of u[n], then n is incremented by 3, i.e., a number large than 1, the minimum step size. If the slope is between 2% and 3% of u[n], then n is incremented by 2, i.e., a number large than 1, the minimum step size. If the slope is between 0.2% and 1% of u[n], then n is incremented by 1, i.e., the minimum step size. If the slope is between −2% and 0.2% of u[n], then n is decremented by 1, so as to conserve system resources, for example. If the slope is between −3% and −2% of u[n], then n is decremented by 2, i.e., a number large than 1, the minimum step size. If the slope is less than −3% of the observed utility, n is decremented by 3, i.e., a number large than 1, the minimum step size. This schedule advantageously speeds up convergence for n to the optimal number. In another embodiment, n may be incremented by 1 if the slope is positive and decremented it by 1 if the slope is negative.

At t=1500, the slope (78.2) is greater than 3% of the value of u[14] (1921.1), so n is incremented by 3, from 14 to 17.

After a period of time, during which the n shared server processes are executing on processor 22, f(n) is observed at 150.

At 160, f(n) is compared to u[n] to determine whether a large change in the performance metric has occurred. If the difference is greater than 50%, for example, then u[n] is reset at 180 and the local algorithm section is entered at 110. The array u[n] may be reset to zero, or some other number indicating an initialized state, such as −1.

At 170, the array u[n] is updated. For example, at t=1600, the number of completed client requests is 194, and the performance metric is 2213.8 (i.e., $194^2/17$). Using n=17 as the array index, u[17] is then set to 2213.8. In one embodiment, an exponential moving average may be stored in u[n]. For t=1600, u[17] may be set to 2213.8, since no other value has yet been stored in u[17], and the utility algorithm section loops back to 140.

In a further embodiment, upper and lower boundaries may be specified for n. The upper boundary avoids the situation when the utility algorithm increases n many times in a row because a positive slope has always been computed, and then an unusually low performance metric is observed at n=$n_{upper}$, which changes the slope from positive to negative and forces n to be decreased many times in a row, until the window was shifted far enough to the left so as to stop considering $n_{upper}$. At that point, a positive slope would be computed, n would be increased, then a negative slope would be computed since $n_{upper}$ would become a part of the window, n would be decreased, etc. This situation can be avoided by marking $n_{upper}$ as the upper boundary and then not considering it during the next utility slope computation step, which advantageously allows the utility algorithm to once again increase n, get another performance metric observation at $n_{upper}$, average them together and get a more faithful estimate of the true performance metric at $n_{upper}$. Eventually, the true performance metric might be such that the utility algorithm proceeds with increasing n for a while longer, assuming that the optimum value of n has not yet been reached.

The lower boundary serves a similar purpose and allows the utility algorithm to avoid oscillations when n was decreased many times in a row because a negative utility slope has always been computed, and then an unusually high utility value has been observed at $n_{lower}$.

Also, in order to make it easier for the algorithm to pass through the boundary, the window would be extended by one point to the left if n=$n_{upper}$, so as to give the utility algorithm a more complete picture of the utility slope in the neighborhood of $n_{upper}$, similar to the one that the algorithm had at $n_{upper}$−1. Similarly, the window would be extended by one point to the right if n=$n_{lower}$, so as to give the utility algorithm a more complete picture of the slope in the neighborhood of $n_{lower}$, similar to the one that the algorithm had at $n_{upper}$+1.

For example, at t=2000, the utility algorithm does not include the upper boundary of 26 into the window used for computing the slope. This allows the utility algorithm to compute a positive slope at t=2000 and make another attempt at increasing the number of processes to 26, thus getting a chance to make another observation of f(26). Then, at t=2100, when n=26, f(26) is observed to be 3190, which is much larger than the previously observed 2680 at t=1900. When these two values are combined using the previously described exponential smoothing procedure, the result is u[n]=2808.0, which is large enough to make the slope positive.

Another factor that helped to make the slope positive was the fact that during the second "assault" at the boundary, the utility algorithm used a larger window for fitting the linear function, going all the way back to n=19, when a relatively low utility was observed. As a result, at t=2100, the utility algorithm recommends further increasing n to 27, getting "through" the previously set boundary. When that happens, the upper boundary is set to −1, as shown at t=2200.

For a database application using a shared server connection model, the number of shared server processes may be optimized by setting the number of shared server processes n to an initial value, and then increasing or decreasing the number of shared server processes n until a performance metric related to database throughput is maximized. In one embodiment, the performance metric is database throughput, such as, for example, the number of completed client requests processed by the shared server processes, while in another embodiment, the performance metric is database throughput squared per process, such as, for example, the square of the number of completed client requests divided by the number of shared server processes n. The number of shared server processes may be set based on the value of the performance metric, as well as the slope of the value of the performance metric.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A non-transitory computer readable medium having instructions stored thereon that, when executed by a processor, cause the processor to optimize shared server processes executing thereon, the optimizing comprising:
   creating, in a memory, a data array for storing a plurality of performance metric values, each of the plurality of performance metric values being associated with a number of shared server processes, n;
   selecting a value for an optimized number of shared server processes, according to a first procedure, based on a first comparison of n, the number of shared server processes, for at least two contiguous entries in the data array, and a second comparison of the performance metric value for the two contiguous entries in the data array;
   observing a performance metric associated with the optimized number of shared server processes selected according to the first procedure;
   storing, in the data array, the value for the optimized number of shared server processes and a performance metric value associated with the optimized number of shared server processes selected according to the first procedure;
   repeating said selecting, observing and storing until a predetermined number of contiguous performance metric values are stored in the data array;
   selecting the value for the optimized number of shared server processes, according to a second procedure, based on a slope of the performance metric, the slope being calculated based on the predetermined number of contiguous performance metric values stored in the data array;
   observing a performance metric associated with the optimized number of shared server processes selected according to the second procedure; and
   storing, in the data array, the value for the optimized number of shared server processes and a performance metric value associated with the optimized number of shared server processes selected according to the second procedure.

2. The non-transitory computer readable medium of claim 1, wherein selecting a value for an optimized number of shared server processes according to the first procedure includes:
   determining whether n, the number of shared server processes, is increasing, decreasing or staying the same based on the first comparison;
   determining whether the performance metric value is increasing or decreasing based on the second comparison;
   determining the optimized number of shared server processes based on the first and second comparisons; and
   setting the number of shared server processes executing on the processor to the optimized number of shared server processes.

3. The non-transitory computer readable medium of claim 1, wherein selecting a value for an optimized number of shared server processes according to the second procedure includes:
   setting the number of shared server processes executing on the processor to the optimized number of shared server processes.

4. The non-transitory computer readable medium of claim 1, wherein the performance metric is the number of completed client requests serviced by the number of shared server processes.

5. The non-transitory computer readable medium of claim 1, wherein the performance metric is a square of the number of completed client requests serviced by the number of shared server processes divided by the number of shared server processes executing on the processor.

6. The non-transitory computer readable medium of claim 3, wherein calculating the slope includes fitting a function to the predetermined number of contiguous performance metric values stored in the data array.

7. The non-transitory computer readable medium of claim 6, wherein the function is a linear function, and fitting the function includes:
   determining an average number of shared server processes;
   determining an average performance metric value;
   determining a sum of the squares of a normalized number of shared processors;
   determining products of a normalized number of shared processes and a normalized performance metric value; and
   calculating the slope by dividing the sum of the squares of the normalized number of shared processors into the products of the normalized number of shared processes and the normalized performance metric value.

8. The non-transitory computer readable medium of claim 1, further comprising calculating an exponential moving average for the performance metric value prior to storing the performance metric value in the data array.

9. The non-transitory computer readable medium of claim 3, further comprising:
   specifying an upper boundary for the optimized number of shared server processes,
   wherein selecting the value for the optimized number of shared server processes according to the second procedure further comprises:
   setting the upper boundary to the optimized number of shared server processes selected by the second procedure when a low performance metric is observed for the optimized number of shared server processes selected by the second procedure, and
calculating the slope of the performance metric without performance metric values that are associated with numbers of shared server processes that are equal to or greater than the upper boundary.

10. The non-transitory computer readable medium of claim 3, further comprising:
specifying a lower boundary for the optimized number of shared server processes,
wherein selecting the value for the optimized number of shared server processes according to the second procedure further comprises:
setting the lower boundary to the optimized number of shared server processes selected by the second procedure when a high performance metric is observed for the optimized number of shared server processes selected by the second procedure, and
calculating the slope of the performance metric without performance metric values that are associated with numbers of shared server processes that are equal to or less than the lower boundary.

11. A computer-based method for optimizing shared server processes executing on a processor, the method comprising:
creating, in a memory, a data array for storing a plurality of performance metric values, each of the plurality of performance metric values being associated with a number of shared server processes, n;
selecting a value for an optimized number of shared server processes, according to a first procedure, based on a first comparison of n the number of shared server processes, for at least two contiguous entries in the data array, and a second comparison of the performance metric value for the two contiguous entries in the data array;
observing a performance metric associated with the optimized number of shared server processes selected according to the first procedure;
storing, in the data array, the value for the optimized number of shared server processes and a performance metric value associated with the optimized number of shared server processes selected according to the first procedure;
repeating said selecting, observing and storing until a predetermined number of contiguous performance metric values are stored in the data array;
selecting the value for the optimized number of shared server processes, according to a second procedure, based on a slope of the performance metric the slope being calculated based on the predetermined number of contiguous performance metric values in the data array;
observing a performance metric associated with the optimized number of shared server processes selected according to the second procedure; and
storing, in the data array, the value for the optimized number of shared server processes and a performance metric value associated with the optimized number of shared server processes selected according to the second procedure.

12. The method of claim 11,
wherein selecting a value for an optimized number of shared server processes according to the first procedure includes:
determining whether n, the number of shared server processes, is increasing, decreasing or staying the same based on the first comparison,
determining whether the performance metric value is increasing or decreasing based on the second comparison,
determining the optimized number of shared server processes based on the first and second comparisons, and
setting the number of shared server processes executing on the processor to the optimized number of shared server processes, and
wherein selecting a value for an optimized number of shared server processes according to the second procedure includes:
setting the number of shared server processes executing on the processor to the optimized number of shared server processes.

13. The method of claim 11, further comprising:
calculating an exponential moving average for the performance metric value prior to storing the performance metric value in the data array,
wherein the performance metric is the number of completed client requests serviced by the number of shared server processes or a square of the number of completed client requests serviced by the number of shared server processes divided by the number of shared server processes executing on the processor.

14. The method of claim 11, wherein calculating the slope includes fitting a linear function to the predetermined number of contiguous performance metric values stored in the data array, the fitting including:
determining an average number of shared server processes;
determining an average performance metric value;
determining a sum of the squares of a normalized number of shared processors;
determining products of a normalized number of shared processes and a normalized performance metric value; and
calculating the slope by dividing the sum of the squares of the normalized number of shared processors into the products of the normalized number of shared processes and the normalized performance metric value.

15. The method of claim 13, further comprising:
specifying an upper boundary for the optimized number of shared server processes, wherein selecting the value for the optimized number of shared server processes according to the second procedure further comprises:
setting the upper boundary to the optimized number of shared server processes selected by the second procedure when a low performance metric is observed for the optimized number of shared server processes selected by the second procedure, and
calculating the slope of the performance metric without performance metric values that are associated with numbers of shared server processes that are equal to or greater than the upper boundary, or
specifying a lower boundary for the optimized number of shared server processes, wherein selecting the value for the optimized number of shared server processes according to the second procedure further comprises:
setting the lower boundary to the optimized number of shared server processes selected by the second procedure when a high performance metric is observed for the optimized number of shared server processes selected by the second procedure, and
calculating the slope of the performance metric without performance metric values that are associated with numbers of shared server processes that are equal to or less than the lower boundary.

16. A system, comprising:
a processor; and
a storage device, coupled to the processor, storing a shared process optimizer module that, when executed by the processor, optimizes shared server processes executing thereon, the optimizing comprising:
creating, in a memory, a data array for storing a plurality of performance metric values, each of the plurality of performance metric values being associated with a number of shared server processes, n,
selecting a value for an optimized number of shared server processes, according to a first procedure, based on a first comparison of n, the number of shared server processes, for at least two contiguous entries in the data array, and a second comparison of the performance metric value for the two contiguous entries in the data array,
observing a performance metric associated with the optimized number of shared server processes selected according to the first procedure,
storing, in the data array, the value for the optimized number of shared server processes and a performance metric value associated with the optimized number of shared server processes selected according to the first procedure,
repeating said selecting, observing and storing until a predetermined number of contiguous performance metric values are stored in the data array;
selecting the value for the optimized number of shared server processes, according to a second procedure, based on a slope of the performance metric, the slope being calculated based on the predetermined number of contiguous performance metric values stored in the data array,
observing a performance metric associated with the optimized number of shared server processes selected according to the second procedure, and
storing, in the data array, the value for the optimized number of shared server processes and a performance metric value associated with the optimized number of shared server processes selected according to the second procedure.

17. The system of claim 16,
wherein selecting a value for an optimized number of shared server processes according to the first procedure includes:
determining whether n, the number of shared server processes, is increasing, decreasing or staying the same based on the first comparison,
determining whether the performance metric value is increasing or decreasing based on the second comparison,
determining the optimized number of shared server processes based on the first and second comparisons, and
setting the number of shared server processes executing on the processor to the optimized number of shared server processes; and wherein selecting a value for an optimized number of shared server processes according to the second procedure includes:
setting the number of shared server processes executing on the processor to the optimized number of shared server processes.

18. The system of claim 16, the optimizing further comprising:
calculating an exponential moving average for the performance metric value prior to storing the performance metric value in the data array,
wherein the performance metric is the number of completed client requests serviced by the number of shared server processes or a square of the number of completed client requests serviced by the number of shared server processes divided by the number of shared server processes executing on the processor.

19. The system of claim 16, wherein calculating the slope includes fitting a linear function to the predetermined number of contiguous performance metric values stored in the data array, the fitting including:
determining an average number of shared server processes;
determining an average performance metric value;
determining a sum of the squares of a normalized number of shared processors;
determining products of a normalized number of shared processes and a normalized performance metric value; and
calculating the slope by dividing the sum of the squares of the normalized number of shared processors into the products of the normalized number of shared processes and the normalized performance metric value.

20. The system of claim 19, the optimizing further comprising:
specifying an upper boundary for the optimized number of shared server processes, wherein selecting the value for the optimized number of shared server processes according to the second procedure further comprises:
setting the upper boundary to the optimized number of shared server processes selected by the second procedure when a low performance metric is observed for the optimized number of shared server processes selected by the second procedure, and
calculating the slope of the performance metric without performance metric values that are associated with numbers of shared server processes that are equal to or greater than the upper boundary, or
specifying a lower boundary for the optimized number of shared server processes, wherein selecting the value for the optimized number of shared server processes according to the second procedure further comprises:
setting the lower boundary to the optimized number of shared server processes selected by the second procedure when a high performance metric is observed for the optimized number of shared server processes selected by the second procedure, and
calculating the slope of the performance metric without performance metric values that are associated with numbers of shared server processes that are equal to or less than the lower boundary.

* * * * *